April 19, 1966   J. L. BURROWS   3,247,511
DOPPLER RADAR SYSTEM
Filed Nov. 5, 1963   2 Sheets-Sheet 1

FIG. IA $$V_x = K_1 \left( f_{d_{13}} - f_{d_{12}} \right)$$

$$V_y = K_2 \left( f_{d_{13}} + f_{d_{12}} \right) - K_3 f_{d_{11}}$$

INVENTOR.
JAMES L. BURROWS
BY
*Philip J. McFarland*
ATTORNEY

INVENTOR.
JAMES L. BURROWS

United States Patent Office 3,247,511
Patented Apr. 19, 1966

3,247,511
DOPPLER RADAR SYSTEM
James L. Burrows, Norwell, Mass., assignor to Laboratory for Electronics, Inc., Boston, Mass., a corporation of Delaware
Filed Nov. 5, 1963, Ser. No. 321,500
5 Claims. (Cl. 343—8)

This invention pertains generally to radar systems and particularly to Doppler radar systems used to derive signals indicative of the ground speed of an airborne vehicle, as an aircraft.

In the field of airborne Doppler radar systems it is customary to provide at least three downwardly pointing beams, each at an acute angle, called the depression angle, as measured from a horizontal plane through the vehicle supporting the system. The returned signals on each beam are combined in any one of many known ways to derive output signals indicative of ground speed, drift and when desired, vertical velocity.

It has been recognized for some time in the art that, even though a signal of a single frequency is transmitted on each beam, returned signals are in a spectrum of frequencies. It has also been recognized that the shape of the spectrum is dependent on the character of the terrain which each such beam illuminates. That is, when a beam is directed toward a rough surface, as a wooded terrain, substantially equal back-scattering of energy occurs at all portions of the illuminated area. When, however, a beam is directed toward a specular or semi-specular surface, as water, equal back-scattering from all portions of the illuminated area does not occur and an apparent increase in the depression angle of the beam results. Such an increase in turn, results in a decrease of up to 5% in the output signals of the system, with a concomitant increase in error.

It has been found that a decrease in the width of the beams of an airborne Doppler radar will reduce the error resulting from differences in the character of the terrain over which a vehicle supporting such a system flies. It is obvious, however, that a reduction in beam width may be accomplished only by increasing (for a given frequency) the size of the beam-forming antenna. Consequently, such an approach may be followed only in special cases where the airborne vehicle is adapted to support a relatively large antenna.

It is also known that a compensating device may be incorporated in airborne Doppler radar systems to correct errors resulting from a change in the character of the terrain. That is, means to increase the output signals of the system by a predetermined amount (say 3% to correspond with average sea conditions) have been provided in known systems to correct so-called "water-bias" conditions. Obviously, however, greater accuracy could be attained by first determining the back-scattering characteristics of the area illuminated by a beam and then producing a compensating signal having an amplitude related to such characteristic.

It is also known that the altitude of an aircraft may be measured by adjusting the pulse repetition frequency of an "interrupted continuous wave" (ICW) radar to an optimum. It is necessary, however, to multiply the radar-derived data by the sine of the depression angle to obtain a signal representing altitude. Obviously, since the apparent depression angle of a slant beam changes with changes in the character of the terrain, such a computation may result in significant error. While the beams of known systems may be arranged to have a vertical beam, such arrangement results in "cross talk" between beams when specular reflection of energy in the vertical beam occurs. Some energy from the vertical beam is received in the sidelobes of the other beams to introduce a false signal in such beams.

Therefore, it is a primary object of this invention to provide an improved Doppler radar system utilizing a vertical beam to measure altitude.

Other objects of this invention are to provide, in a Doppler radar system, means for determining the character of the terrain beneath an aircraft and means for automatically correcting the radar-derived output signals of such a system in accordance with the character of the terrain. Another object of this invention is to provide an improved Doppler radar system which will accomplish the foregoing objects with conventional components without interfering with the primary functions of the system.

These and other objects of this invention are attained generally by an airborne Doppler ICW radar system having an antenna adapted to project at least two slant beams and one vertical beam; means for energizing the antenna so that the beams are formed sequentially and the frequency of the electromagnetic energy in the vertical beam differs from the frequency of the electromagnetic energy in the slant beams the pulse repetition rate of the system being optimum for the vertical beam; and means for generating a compensating signal in accordance with the difference in the magnitude of the reflected energy received by the vertical and slant beams to correct the Doppler-derived velocity signals in accordance with the character of the reflecting surface.

For a more complete understanding of the invention, reference is now made to the accompanying detailed description of a preferred embodiment of the invention and to the drawings, in which.

Figure 1:
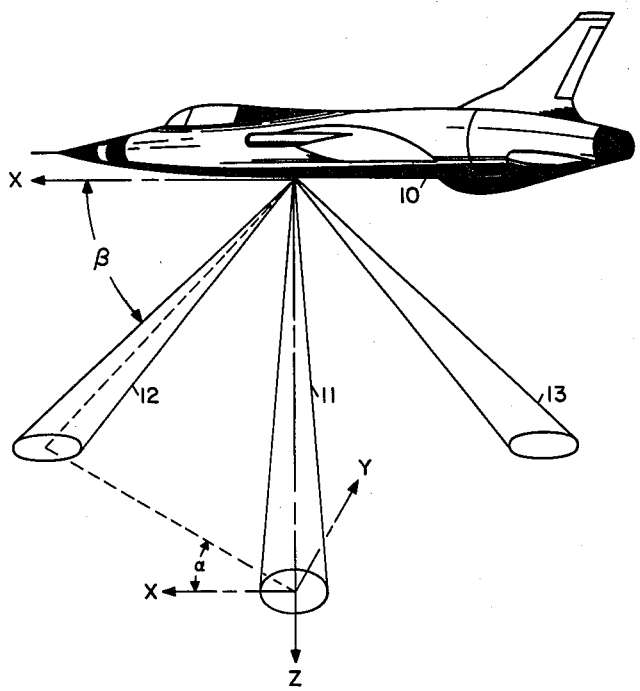
FIG. 1A is a sketch showing the directions in which a vertical beam and two slant beams are, in a preferred embodiment of the invention, oriented with respect to an aircraft in order to provide return signals of the type contemplated.
FIG. 1B is a table of equations showing the manner in which the return signals in the beams of FIG. 1A may be combined to derive signals indicative of ground speed, drift and vertical velocity; and, FIG. 2 is a simplified block diagram of a Doppler radar system according to the invention.

Referring now to FIG. 1A it may be seen that the coordinates marked $V_x$, $V_y$ and $V_z$ indicate, respectively, forward, sideways and vertical velocities of an aircraft 10 and three pencil beams 11, 12, 13 are directed downwardly from the aircraft 10 as shown. It will be observed that, when the aircraft 10 is moving at a constant altitude in level flight, the axis of the beam 11 is normal to the surface beneath the aircraft and the outer edges of that beam are inclined to the surface at an angle equal to one-half the beam width. It follows then that, in the illustrated case, the spectrum of returned signals on beam 11 is centered on the transmitted frequency and is relatively narrow. More important, however, is the fact that regardless of the character on the surface on which beam 11 impinges, the center frequency of the spectrum of received signals remains constant. Only the amplitude of the components making up the spectrum of returned signals varies with changes in the character of the surface on which beam 11 impinges. When the surface is rough, backscattering from all portions of the area illuminated by beam 11 occurs (thus increasing the returns from points near the edge of beam 11 and widening the spectrum), but when the surface is smooth, specular reflection occurs (thus decreasing returns from points near the edge and, simultaneously, increasing returns from the center portion of the beam 11 and narrowing the spectrum). With respect to beams 12, 13, however, a different situation obtains. That is, since the axes of beams 12, 13 impinge on the surface at an angle $\beta$, the character of the surface affects both the amplitude and the center frequency of the spectrum of returned signals on each such beams. When the surface is rough, backscattering from all portions of the area illuminated by the beams 12, 13 occurs and the spectrums of the returned signals on the beams 12, 13 are composed of returns from all parts of the area illuminated. The spectrum of the returns on beam 12 is centered almost on the transmitted frequency plus the Doppler shift frequency of axial signals on beam 12, while the spectrum of the returns on beam 13 is centered almost on the transmitted frequency minus the Doppler shift frequency of axial signals on beam 13. When, however, the character of the surface illuminated by beams 12, 13 approaches a smooth surface, more and more specular reflection occurs at all parts of the area illuminated by the beams. It is evident, then, that the greater the total amount of specular reflection of energy in beams oriented as are beams 12, 13 the less energy is returned to the aircraft 10. A decrease in the total energy returned, although ordinarily undesirable, does not introduce any error. Since, however, the spectrum of the returned signals on beams 12, 13 shifts toward the transmitted frequency then an error is introduced. The shift in the spectrum of returned signals is due to the fact that equal specular reflection per unit area across the beams 12, 13 does not occur. In effect an apparent increase in the depression angle $\beta$ of the beams 12, 13 is experienced. Such an increase, in turn, causes a decrease in the center frequency of the spectrum of the returned signals and a decrease in the indicated velocity of the aircraft 10.

The fact that, with a change in the character of the area illuminated, the total energy returned on a vertical beam, as beam 11, varies in a different manner than the total energy returned on a slant beam, as beam 12 or 13, has been verified by experiment. Thus, with a slant beam at a depression angle of 70°, it has been found that the amplitude of the returned signals on such a beam is approximately equal to the amplitude of the returned signal on a vertical beam when land is illuminated. Over calm water, however, the amplitude of the signal on such a slant beam is down some 16 to 17 db while the signal on a vertical beam is up some 16 to 17 db. Further, correlation exists between the change in signal strength of each beam and the roughness of the water. It follows that, if pencil beams arranged as in FIG. 1A are directed toward a surface, a comparison of the amplitude of the returned signals on the vertical beam with the amplitude of the returned signals on either or both of the slant beams will provide an indication of whether the aircraft supporting a Doppler radar system is over land or is over water. Further, if the aircraft 10 is over water, an indication of the roughness of the water may be derived or if the aircraft 10 passes over a coast line, there will be in almost all cases, abrupt change in the ratio of the amplitude of the signals in the vertical and slant beams.

It will be evident to those having skill in the art that the signals on the beams 11, 12 and 13 must be processed to derive signals corresponding to velocity along predetermined axes, as X, Y and Z. The equations for processing the signals set out in FIG. 1B give respectively ground speed, $V_x$, drift, $V_y$, and vertical speed, $V_z$, along the indicated axes with respect to the aircraft 10 when the beams 11, 12, 13 are arranged as in FIG. 1A. The sense of each velocity signal is positive in the direction of the arrow on each coordinate arrow as shown in FIG. 1A. It will be noted that $V_x$ equals the difference in the Doppler frequencies ($fd_{12}$, $fd_{13}$) measured on beams 12 and 13 multiplied by a constant $K_1$. The constant $K_1$, as shown in U.S. Patent No. 3,102,263, depends upon the frequency of the signal transmitted and the orientation of the beams 12, 13, i.e. the angles $\alpha$ and $\beta$, shown in FIG. 1A, and, as noted hereinbefore, the character of the reflected terrain. The drift, $V_y$, equals the sum of the Doppler frequencies measured on beams 12, 13 less any Doppler frequency due to vertical movement of the aircraft 10. Each Doppler component must of course, be translated into aircraft coordinates by multiplying each by an appropriate constant $K_2$, $K_3$ in the manner set forth in U.S. Patent No. 3,102,263. It will be noted, however, that a correction for change in the character of the terrain need not be applied to derive a value for drift, $V_y$, the uncorrected velocity being sufficiently accurate for ordinary navigational purposes, in view of the fact that the absolute value of drift is usually far smaller than that of ground speed. Vertical velocity $V_z$ is simply the Doppler frequency on beam 11 multiplied by a constant $K_4$.

It will be obvious to those in the art that the equations just given will hold regardless of the attitude of the aircraft 10, provided the beams 11, 12, 13 originate at a stable platform. If the beams 11, 12, 13 originate from antennas which are fixed relative to the aircraft 10 of FIG. 1A, then pitch, roll and yaw of the aircraft will affect the Doppler frequencies in the returned signals on each beam. It is known, however, that the effect of pitch, roll and yaw may be compensated (as shown in U.S. Patent No. 3,102,263). Further, the velocities $V_x$, $V_y$ and $V_z$ along coordinates fixed with respect to the aircraft 10 may be translated into velocities along geographical coordinates and, through known integrational processes, into geographic position of the aircraft 10. The solution of the equations of FIG. 1B is accomplished by the system illustrated in FIG. 2 wherein means for deriving a correction signal to modify the constant $K_1$ is particularly shown.

Figure 2:
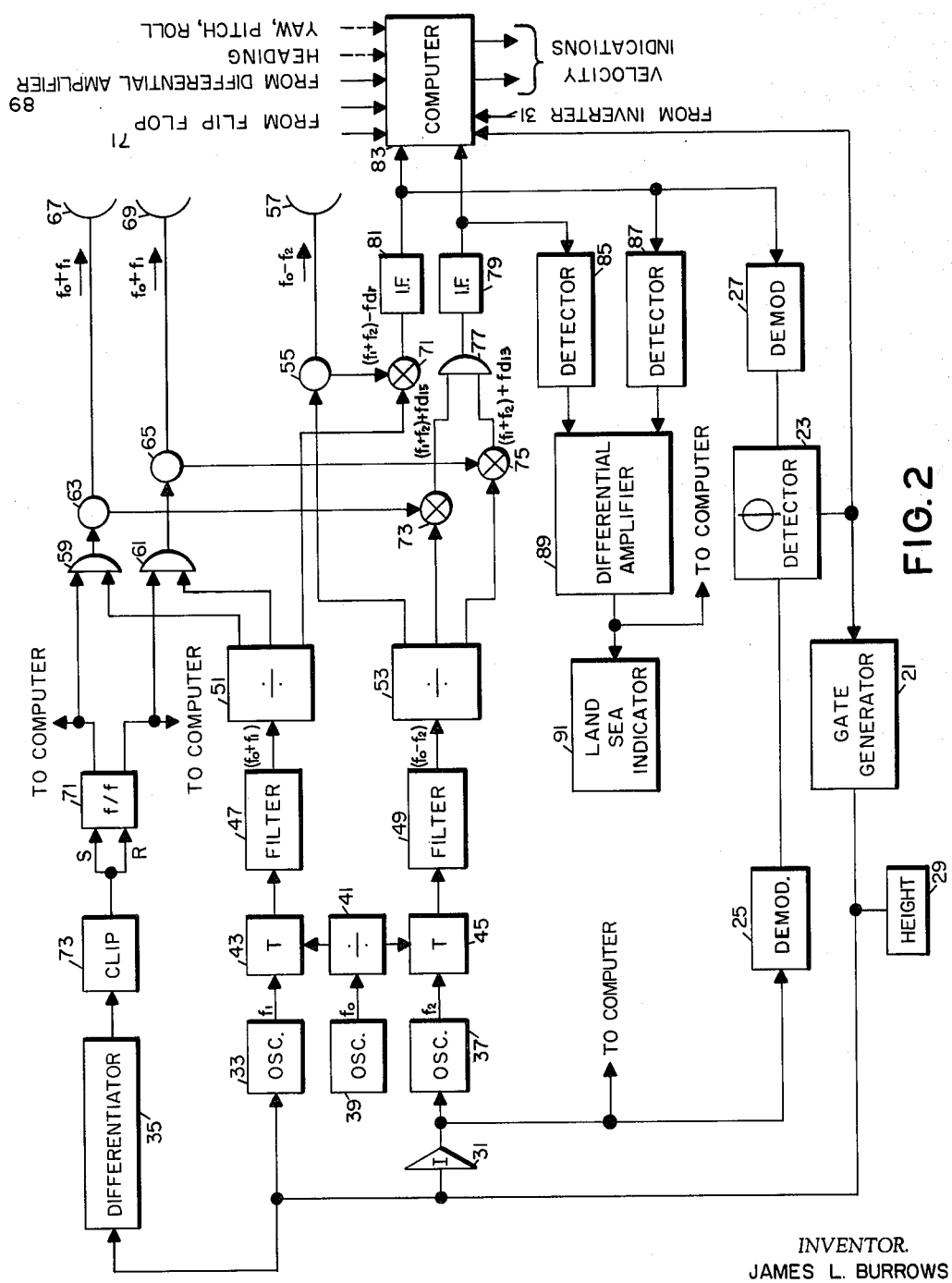

With the foregoing in mind it may be seen that the system shown in FIG. 2 is controlled by a gate generator 21 which produces a series of square wave gating signals, the length of each period in the square wave gating signals preferably, but not necessarily, being controlled by the output of a phase detector 23. The latter element, in turn, is preferably of the type shown and described in the application (assigned to the same assignee of this invention) of George V. Colby, Jr. Serial No. 272,568 filed April 12, 1963 and entitled Radar Altimeter. As is explained in detail in the just-cited application, the envelopes of the signal transmitted on the vertical beam 11 and the signal returned on that beam are demodulated in demodulators 25, 27 and compared to maintain the pulse length of the transmitted signal (as determined by the gate generator 21) at an optimum value for ICW operation meaning that the transmitted and receiver energy occupy mutually exclusive and successive periods of time. The output of the gate generator 21 is divided into four paths. The first path leads to a height indicator 29, which may simply be a known integrator to produce an output signal whose amplitude is proportional to the length of the square wave out of the gate generator 21. Such a signal, then, is representative of the height ($h$) of the aircraft 10 as shown in FIG. 1 without error due to any apparent change in depression angle. The second, third and fourth paths lead, respectively, to an inverter 31, an oscillator 33 and a differentiator 35.

The output of the inverter 31 is led to the demodulator 25 and to an oscillator 37. It may be seen, therefore, that oscillators 33 and 37 are gated on during mutually exclusive periods of time. While it is possible that oscillator 33 and oscillator 37 be identical, it is preferred that oscillator 33 be designed to operate at, say 53 mc., here designated $f_1$, and that oscillator 37 be designed to operate at say 7 mc., here designated $f_2$, in order to minimize crosstalk in the circuits.

An oscillator 39, designed to produce a continuous microwave signal at say 9600 mc., here designated $f_2$, is connected through a divider 41 to a pair of conventional magic T's 43, 45 as shown. It is apparent, then, that in the spectrum of frequencies out of magic T 43, there is a component at a frequency $(f_0+f_1)$ and that, in the spectrum of frequencies out of magic T 45, there is a component at a frequency $(f_0-f_1)$. The just-mentioned components are passed, respectively through conventional band pass filters 47, 49 and dividers 51, 53. One output line from divider 53 is led to a duplexer and thence to an antenna 57 to form the vertical beam of FIG. 1. A first and a second output line from the divider 51 are led, respectively to AND gates 59, 61, thence through duplexers 63, 65 to antennas 67, 69 as shown. The AND gates 59, 61 are enabled at mutually exclusive times by the normal and complementary signal output of a flip-flop 71, which in turn is set and reset by the output of the differentiator 35 after passing through a clipping circuit 73. It may be observed here that antennas 57, 67, 69 are energized sequentially according to the following program: first antenna 57, then antenna 67, then antenna 57, then antenna 69, then antenna 57. Further, it may be observed that the carrier frequency of the energy to antenna 57 is $(f_0-f_2)$ whereas the carrier of the energy to antennas 67, 69 is $(f_0+f_1)$. This difference, for reasons set forth hereinafter, effectively decouples antenna 57 and antennas 67, 69.

The receiver in the contemplated system is of the heterodyne type with an intermediate frequency equal to $(f_1+f_2)$. Such a frequency is derived by mixing the echo signals received by antenna 57, 67, 69 with an appropriate signal from either divider 51 or divider 53 as shown. Thus, the echo signals returned through antenna 57 pass through the duplexer 55 to a mixer 71, wherein such signals are heterodyned with a portion of the signal out of divider 51. One component of the spectrum resulting from this mixing is at a frequency $(f_1+f_2) - fd_{11}$, where $fd_{11}$ is the Doppler frequency on the signal reflected in the beam 11 of FIG. 1. In like manner, the echo signals returned through antennas 67, 69, pass, respectively, through duplexers 63, 65 to mixers 73, 75 wherein each is mixed with a portion of the signal from divider 53. Thus, as shown, the signals at $(Ff_1+f_2)+fd_{13}$ and $(f_1+f_2)+fd_{15}$ (where $fd_{13}$ is the Doppler frequency in the beam 13 of FIG. 1 and $fd_{12}$ is the Doppler frequency in the beam 12 of FIG. 1) are produced. The signals out of the mixers 73, 75 are passed through an OR gate 77 to an I.F. amplifier 79 while the signal out of mixer 71 is passed directly to an I.F. amplifier 81. Each I.F. amplifier 79, 81 is of conventional construction to amplify a band of frequencies centered on $(f_1+f_2)$ and encompassing the highest expected Doppler frequencies. It should be noted, however, that some care should be taken in the design of I.F. amplifiers 79, 81 to provide a sufficient dynamic range for the two to accommodate signals which may vary in the order of 20 db.

The output of I.F. amplifier 81 and the output of I.F. amplifier 79 are each divided, as shown, between a conventional computer 83 for solving the equations of FIG. 1A, a detector 85 and a detector 87. The last named elements may be conventional peak detectors, each producing a D.C. signal output proportional to the amplitude of the outputs of I.F. amplifiers 79, 81. The outputs of the detectors 85, 87 are fed into a differential amplifier 89 to produce a signal representative of the difference between amplitude of the signals out of the detectors 85, 87. The signal out of the differential amplifier 89 is divided to energize a land-sea indicator 91 (which element may be a conventional D.C. instrument, appropriately calibrated) and to the computer 83 to provide a correction signal to modify the output signal of the latter element in accordance with the amplitude of the differential amplifier 89.

The just described Doppler radar operates automatically to provide a compensating signal related to the character of the terrain over which it moves. Thus, when the system is over a rough surface, as land, there is little, if any difference in the power returned on the vertical 11 and slant beams 13, 15. As a result, then, the output of the differential amplifier 89 is such that no correction signal is sent to the computer 83. When, however, the vertical beam 11 impinges on a relatively smooth surface, as water, a correction signal proportional to the smoothness of such a surface is sent to the computer 83 and the land-sea indicator 91 shows that the aircraft is over water.

It will be observed that, since the frequency of the signal of beam 11 differs from the frequency of the signals of beams 13, 12 by an amount equal to the intermediate frequency of the system, energy transmitted on beam 11 which may be received on a sidelobe of the antennas 67, 69 forming either beam 13 or 12 will not be heterodyned in mixers 73, 75 to produce a signal within the band-pass frequency of I.F. amplifier 79. In other words, the difference in transmitted frequencies acts to decouple the antennas 67, 69 completely from antenna 57. It should be noted, however, that it is not essential to the invention that the transmitted frequencies be separated from each other by exactly the I.F. frequency as in the illustrated case. It is necessary only, if a conventional carrier elimination filter is not used at the output of the I.F. amplifier 79, to transmit a signal of such frequency on beam 11 that, if it is heterodyned in the mixers 73, 75 a signal outside the band-pass frequencies of the I.F. amplifier 79 be produced.

Other modifications to the illustrated embodiment of the invention will be obvious to those having skill in the art. For example, there is nothing limiting the position and number of beams (so long as a vertical beam is produced) nor is there any reason why the antenna system may not be mounted on a stable platform, if desired. Further, in view of the fact that the beams are formed sequentially, it follows that there is nothing in the disclosed system which requires separate I.F. amplifiers for the vertical and slant beams. It is felt, therefore that the invention should not be restricted to the embodiment shown and described, but rather should be limited only by the spirit and scope of the appended claims.

What is claimed is:

1. Airborne Doppler radar apparatus comprising:
    (a) means for downwardly transmitting pulses of electromagnetic energy in a plurality of beams, one of the beams being vertical and the frequency of the energy of such beam differing from the frequency of the energy in the remaining beams;
    (b) means for receiving the electromagnetic energy returned in each of the plurality of beams from the terrain beneath the vehicle supporting the apparatus;
    (c) and means for comparing the amplitude of the signal returned in the vertical beam and the amplitude of the signal returned in at least one of the other beams to generate a signal in accordance with the difference between the respective amplitudes, the signal indicating the nature of the terrain.

2. Airborne Doppler radar apparatus as in claim 1 wherein the difference in frequency between the electromagnetic energy transmitted in the vertical beam and the electromagnetic energy transmitted in the remaining ones of the plurality of beams equals the intermediate frequency of the means for receiving the electromagnetic frequency.

3. Airborne Doppler radar apparatus, comprising:
    (a) means for generating, during mutually exclusive and successive periods of time, electromagnetic energy at a first and a second frequency;
    (b) an antenna adapted to transmit a vertical beam and a first and a second slant beam, each such slant beam being fixedly disposed with respect to the vertical beam;
    (c) means for connecting the antenna with the first-named means so that electromagnetic energy at the first frequency is transmitted in the vertical beam and electromagnetic energy at the second frequency is transmitted alternately in the first and the second slant beam;

(d) means for heterodyning electromagnetic energy returned in the vertical beam with electromagnetic energy at the second frequency and electromagnetic energy returned in the first and second slant beam with electromagnetic energy at the first frequency to derive three spectra of signals at an intermediate frequency representative of the Doppler shift in the frequency of the electromagnetic energy returned, respectively, in the vertical, the first and the second slant beam;

(e) means for comparing the amplitude of the signals in the spectrum corresponding to the electromagnetic energy in the vertical beam with the amplitude of the signals in at least one of the slant beams to derive a correction signal proportional to the difference between such amplitudes;

(f) means for mixing the spectra to derive low frequency signals proportional to velocity of the vehicle supporting the Doppler radar apparatus along predetermined coordinates; and, (g) means for multiplying at least one of the low frequency signals by the correction signal.

4. Airborne radar apparatus as in claim 3 wherein the means for generating electromagnetic energy at a first and a second frequency is responsive to the altitude of the vehicle supporting the apparatus to control the length of the period of time during which electromagnetic energy is generated at the first frequency.

5. Airborne radar apparatus as in claim 4 wherein the means for comparing the amplitude of the signals in at least two of the three spectra includes a peak detector for each spectrum and a differential amplifier for each pair of spectra to be compared.

References Cited by the Examiner

UNITED STATES PATENTS

| | | | |
|---|---|---|---|
| 3,023,407 | 2/1962 | Basim | 343—9 X |
| 3,044,059 | 7/1962 | Belchis | 343—8 |
| 3,071,766 | 1/1963 | Fenn | 343—13 |
| 3,077,594 | 2/1963 | McKay | 343—8 |
| 3,102,263 | 8/1963 | Meyer | 343—9 X |
| 3,141,161 | 7/1964 | King | 343—13 X |
| 3,159,834 | 12/1964 | Fiocco | 343—8 X |

CHESTER L. JUSTUS, *Primary Examiner.*

RODNEY D. BENNETT, *Assistant Examiner.*